(12) United States Patent
Toyota

(10) Patent No.: US 11,454,317 B2
(45) Date of Patent: Sep. 27, 2022

(54) METHOD FOR CONTROLLING POWER TRANSMISSION DEVICE AND POWER TRANSMISSION DEVICE

(71) Applicant: Nissan Motor Co., Ltd., Yokohama (JP)

(72) Inventor: Ryohey Toyota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 339 days.

(21) Appl. No.: 16/957,740

(22) PCT Filed: Dec. 28, 2017

(86) PCT No.: PCT/JP2017/047327
§ 371 (c)(1),
(2) Date: Jun. 25, 2020

(87) PCT Pub. No.: WO2019/130569
PCT Pub. Date: Jul. 4, 2019

(65) Prior Publication Data
US 2020/0347931 A1    Nov. 5, 2020

(51) Int. Cl.
*F16H 61/662* (2006.01)
*F16H 9/18* (2006.01)
*F16H 61/00* (2006.01)
*F16H 61/66* (2006.01)

(52) U.S. Cl.
CPC ............. *F16H 61/662* (2013.01); *F16H 9/18* (2013.01); *F16H 61/0021* (2013.01); *F16H 2061/6604* (2013.01)

(58) Field of Classification Search
CPC ...... F16H 61/662; F16H 61/0021; F16H 9/18; F16H 2061/6604; F16H 61/0206
See application file for complete search history.

(56) References Cited

U.S. PATENT DOCUMENTS

| 8,152,692 B2* | 4/2012 | Tanaka .............. F16H 61/66272 477/162 |
| 9,689,494 B2* | 6/2017 | Inagawa .......... F16H 61/66272 |
| 10,274,082 B2* | 4/2019 | Van Der Sluis .... F16H 61/0031 |

FOREIGN PATENT DOCUMENTS

JP    4299068 B2    7/2009

* cited by examiner

*Primary Examiner* — Tinh Dang
(74) *Attorney, Agent, or Firm* — Global IP Counselors, LLP

(57) ABSTRACT

A method controls a power transmission device including a continuously variable transmission, an electric oil pump provided in a first oil passage connecting primary and secondary pulley oil chambers of the continuously variable transmission, and a switching valve provided at a branch point between the first oil passage and a second oil passage that branches from the first oil passage between the electric oil pump and the primary pulley oil chamber and that is connected to an oil reservoir. A third oil passage branches from the first oil passage between the electric oil pump and the secondary pulley oil chamber. The method makes a magnitude of a hydraulic pressure difference between the third oil passage and the first oil passage one the side of the primary pulley oil chamber smaller than a prescribed threshold value when the switching valve switches between a first position and a second position.

6 Claims, 4 Drawing Sheets

METHOD FOR CONTROLLING POWER TRANSMISSION DEVICE AND POWER TRANSMISSION DEVICE

CROSS-REFERENCE TO RELATED APPLICATIONS

This application is a U.S. national stage application of International Application No. PCT/JP2017/047327, filed on Dec. 28, 2017.

TECHNICAL FIELD

The present invention relates to a method for controlling a power transmission device and a power transmission device.

BACKGROUND INFORMATION

Japanese Patent No. 4 299 068B discloses a belt-type continuously variable transmission in which an electric oil pump used for shifting is provided in an oil passage that connects a primary pulley oil chamber and a secondary pulley oil chamber. The technology of Japanese Patent No. 4 299 068B comprises a switching valve for using an electric oil pump for shifting as a source pressure.

SUMMARY

In a technique such as the one described above, it is conceivable to provide a switching valve for switching a circuit for supplying and discharging oil to the primary pulley oil chamber from a circuit that carries out supply and discharge using an electric oil pump to a circuit that carries out supply and discharge using an actuator other than the electric oil pump, such as a solenoid.

However, when switching the switching valve, if there is difference in the hydraulic pressure between the circuit used for supply and discharge of oil before switching the switching valve and the circuit used for supply and discharge of oil after switching the switching valve, a sudden change in the hydraulic pressure could occur. As a result, there is the risk that unintended shifting or slippage may occur.

In view of the problem described above, an object of the present invention is to provide a method for controlling a power transmission device and a power transmission device that can prevent the occurrence of unintended shifting or slippage in a continuously variable transmission mechanism, when switching the switching valve for switching the electric oil pump between use for shifting and use for source pressure.

A method for controlling a power transmission device according to the present invention is provided with a continuously variable transmission mechanism that transmits power between a drive source and a drive wheel, a first oil passage that connects a primary pulley oil chamber and a secondary pulley oil chamber of the continuously variable transmission mechanism, an electric oil pump provided in the first oil passage, a second oil passage that branches from the first oil passage between the electric oil pump and the primary pulley oil chamber and that is connected to an oil reservoir, a switching valve provided at a branch point between the first oil passage and the second oil passage, and a third oil passage that branches from the first oil passage between the electric oil pump and the secondary pulley oil chamber and reaches the switching valve, and the switching valve switches between two positions, a first position in which at least the first oil passage is connected, and a second position in which the second oil passage connects with the first oil passage on a side of the secondary pulley oil chamber and in which the third oil passage and connects with the first oil passage on a side of the primary pulley oil chamber, comprising making a magnitude of a hydraulic pressure difference between the third oil passage and the first oil passage one the side of the primary pulley oil chamber smaller than a prescribed threshold value when switching the switching valve between the first position and the second position.

According to another aspect of the present invention, a power transmission device corresponding to the method for controlling a power transmission device of the above-described aspect is provided.

DETAILED DESCRIPTION OF THE EMBODIMENTS

Embodiments of the present invention will be described below, with reference to the appended drawings.

Figure 1:
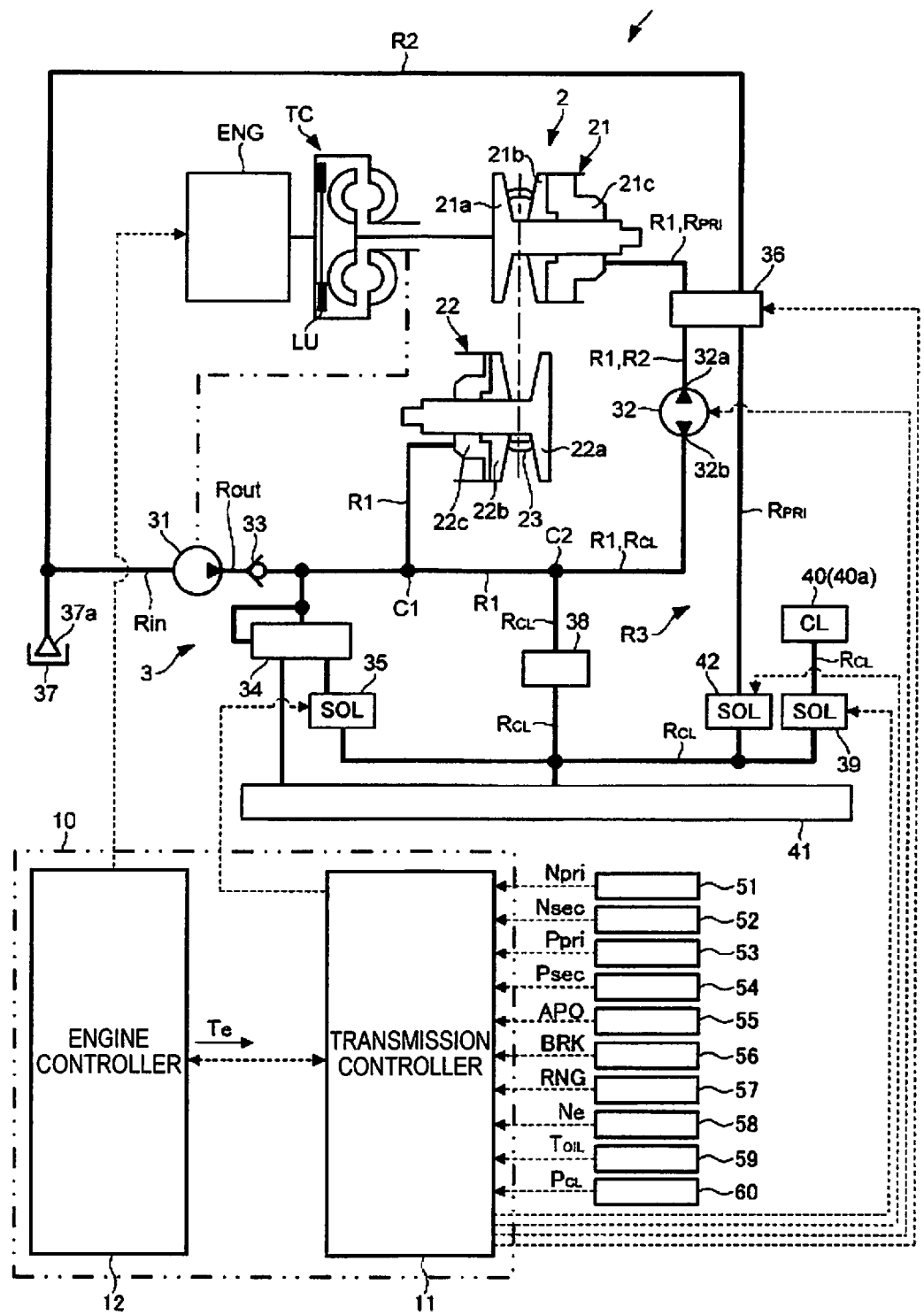
FIG. 1 is a schematic overview showing main components of a vehicle.

FIG. 1 is a schematic overview showing main components of a vehicle. A transmission 1 is a belt-type continuously variable transmission and is mounted on a vehicle together with an engine ENG, which constitutes a drive source of the vehicle. Rotation of the engine ENG is input to the transmission 1. The rotation output from the engine ENG is input to the transmission 1 via a torque converter TC, etc., having a lockup clutch LU. The transmission 1 outputs the input rotation at a rotation corresponding to the transmission ratio.

The transmission 1 has a variator 2 and a hydraulic circuit 3.

The variator 2 is provided in a power transmission path that connects the engine ENG and a drive wheel, which are not shown, and transmits power therebetween. The variator 2 is a belt-type continuously variable transmission mechanism provided with a primary pulley 21, a secondary pulley 22, and a belt 23 wound around the primary pulley 21 and the secondary pulley 22.

The variator 2 changes the groove width of the primary pulley 21 and the secondary pulley 22, respectively, to thereby change the winding diameter of the belt 23 in order to carry out gear shifting. Hereinbelow, primary is referred to as PRI and secondary is referred to as SEC.

The PRI pulley 21 has a fixed pulley 21a, a movable pulley 21b, and a PRI pulley oil chamber 21c. Oil is supplied to the PRI pulley oil chamber 21c in the PRI pulley 21. When the movable pulley 21b is moved by the oil in the PRI pulley oil chamber 21c, the groove width of the PRI pulley 21 is changed.

The SEC pulley 22 has a fixed pulley 22a, a movable pulley 22b, and a SEC pulley oil chamber 22c. Oil is supplied to the SEC pulley oil chamber 22c in the SEC pulley 22. When the movable pulley 22b is moved by the oil in the SEC pulley oil chamber 22c, the groove width of the SEC pulley 22 is changed.

The belt 23 is wound onto a V-shaped sheave surface formed by the fixed pulley 21a and the movable pulley 21b of the PRI pulley 21, and a V-shaped sheave surface formed by the fixed pulley 22a and the movable pulley 22b of the SEC pulley 22. The belt 23 is held by a belt clamping force generated by SEC pressure Psec, which is the hydraulic pressure of the SEC pulley oil chamber 22c.

In addition to the PRI pulley oil chamber 21c and the SEC pulley oil chamber 22c, the hydraulic circuit 3 has a mechanical oil pump 31, an electric oil pump 32, a check valve 33, a line pressure regulating valve 34, a line pressure solenoid 35, a switching valve 36, an oil reservoir 37, a pilot valve 38, a clutch pressure solenoid 39, a clutch 40, a T/C hydraulic pressure system 41, and a PRI pressure solenoid 42. These configurations, together with the oil passage, configure the hydraulic circuit 3 as follows.

The PRI pulley oil chamber 21c and the SEC pulley oil chamber 22c are connected by a first oil passage R1. The mechanical oil pump 31 is connected to the first oil passage R1 via a discharge-side oil passage Rout of the mechanical oil pump 31. The mechanical oil pump 31 is a mechanical oil pump that is driven by the power of the engine ENG, and is connected to an impeller of the torque converter TC via a power transmission member, as schematically shown by the two-dot broken line.

The check valve 33 is provided in the discharge-side oil passage Rout. The check valve 33 prevents flow of oil in the direction of the mechanical oil pump 31, and allows the flow of oil in the opposite direction. The line pressure regulating valve 34 is connected to a portion of the discharge-side oil passage Rout that is downstream of the check valve 33.

The line pressure regulating valve 34 regulates the oil supplied from the mechanical oil pump 31 to the line pressure PL. The line pressure regulating valve 34 operates in accordance with the solenoid pressure generated by the line pressure solenoid 35. In the present embodiment, the line pressure PL is supplied to the SEC pulley oil chamber 22c as the SEC pressure Psec.

The electric oil pump 32 and the switching valve 36 are provided in the first oil passage R1. The electric oil pump 32 is provided in a portion of the first oil passage R1 that is closer to the PRI pulley oil chamber 21c side of a first point C1, which is the point at which the discharge-side oil passage Rout is connected. The electric oil pump 32 is configured to be rotatable in the forward and reverse directions. Specifically, the forward direction is the direction in which the oil is supplied to the PRI pulley oil chamber 21c side, and the reverse direction is the direction in which the oil is supplied to the SEC pulley oil chamber 22c side.

The switching valve 36 is provided in a portion of the first oil passage R1 between the electric oil pump 32 and the PRI pulley oil chamber 21c. The switching valve 36 has, as switching positions, a first position P1 and a second position P2, and is configured to be capable of switching between the first position P1 and the second position P2. The switching positions of the switching valve 36 will be described further below.

The electric oil pump 32 is connected to the oil reservoir 37 via a second oil passage R2. Specifically, the second oil passage R2 is connected to a strainer 37a inside the oil reservoir 37. The second oil passage R2 includes an oil passage that connects the oil reservoir 37 and the switching valve 36, and a portion of the first oil passage R1 between the switching valve 36 and the electric oil pump 32. The former oil passage is an oil passage that does not pass through other oil passages that connect to the switching valve 36. Because the switching valve 36 is provided so as to connect these, the switching valve 36 also is provided in the second oil passage R2.

Specifically, the second oil passage R2 is connected to an oil inlet/outlet 32a of the electric oil pump 32 on the PRI pulley oil chamber 21c side. The portion of the first oil passage RI between the switching valve 36 and the electric oil pump 32 also serves as a part of the second oil passage R2. The mechanical oil pump 31 is also connected to a portion of the second oil passage R2 closer to the oil reservoir 37 side than the switching valve 36, via an intake-side oil passage Rin.

The second oil passage R2 and the switching valve 36 configured as described above can be understood as follows. That is, the second oil passage R2 can be understood to be an oil passage that branches from the first oil passage R1 between the electric oil pump 32 and the PRI pulley oil chamber 21c and connects to the oil reservoir 37. In addition, the switching valve 36 can be understood to be a switching valve provided at a branch point between the first oil passage R1 and the second oil passage R2.

The oil reservoir 37 is an oil reservoir for storing oil that is supplied by the mechanical oil pump 31 and the electric oil pump 32, and the oil is sucked from the oil reservoir 37 through the strainer 37a. The oil reservoir 37 may be composed of a plurality of oil reservoirs.

The electric oil pump 32 is connected to the clutch 40, specifically, to a clutch oil chamber 40a of the clutch 40, via a clutch oil passage $R_{CL}$. The clutch oil passage $R_{CL}$ includes a portion of the first oil passage R1 between the electric oil pump 32 and a second point C2. The second point C2 is a point in the first oil passage R1 between the electric oil pump 32 and the first point C1. The clutch oil passage $R_{CL}$ further includes an oil passage that connects the second point C2 and the clutch 40.

Specifically, the clutch oil passage $R_{CL}$ is connected to an oil inlet/outlet 32b of the electric oil pump 32 on a side of the SEC pulley oil chamber 22c. The portion of the first oil passage R1 between the electric oil pump 32 and the second point C2 also serves as a part of a clutch oil passage $R_{CL}$. The clutch oil passage $R_{CL}$ is an oil passage that does not pass through the second oil passage R2.

The clutch 40 is engaged by supplying oil to the clutch oil chamber 40a, and is released by draining the oil from the clutch oil chamber 40a. The clutch 40 transmits power between the engine ENG and the drive wheels, together with the variator 2. The clutch 40 connects/disconnects the power transmission path connecting the engine ENG and the drive wheels. The clutch 40 constitutes a hydraulic device other than the variator 2.

The pilot valve 38 is provided in a portion of the clutch oil passage $R_{CL}$ that branches from the first oil passage R1. In addition, the clutch pressure solenoid 39 is provided in a portion of the clutch oil passage $R_{CL}$ between the pilot valve 38 and the clutch 40. The pilot valve 38 reduces the pressure of the oil that is supplied from the first oil passage R1. The clutch pressure solenoid 39 adjusts the pressure of the oil supplied to the clutch 40, that is, the oil pressure $P_{CL}$ of the clutch oil chamber 40a.

A PRI oil passage $R_{PRI}$ also branches off from the clutch oil passage $R_{CL}$ and connects to the PRI pulley oil chamber 21c. The PRI oil passage $R_{PRI}$ includes an oil passage that connects the clutch oil passage $R_{CL}$ and the switching valve 36, and a portion of the first oil passage R1 between the switching valve 36 and the PRI pulley oil chamber 21c. The former oil passage is an oil passage that does not pass through other oil passages that connect to the switching valve 36. Because the switching valve 36 is provided so as to connect these, the switching valve 36 also is provided in the PRI oil passage $R_{PRI}$.

Specifically, the PRI oil passage $R_{PRI}$ branches from a portion of the clutch oil passage $R_{CL}$ between the pilot valve 38 and the clutch pressure solenoid 39. In addition, the PRI pressure solenoid 42 is provided in the PRI oil passage $R_{PRI}$. The PRI pressure solenoid 42 is a pressure regulating valve that regulates the oil supplied to the PRI pulley oil chamber 21c, and is provided in a portion of the PRI oil passage $R_{PRI}$ between the switching valve 36 and the clutch oil passage $R_{CL}$. The portion of the first oil passage R1 between the PRI pulley oil chamber 21c and the switching valve 36 also serves as a part of the PRI oil passage $R_{PRI}$.

Together with a part of the clutch oil passage $R_{CL}$ (specifically, the clutch oil passage $R_{CL}$ between the second point C2 and a point from which the PRI oil passage $R_{PRI}$ branches), the PRI oil passage $R_{PRI}$ can be understood to be a third oil passage R3 that branches from the first oil passage R1 between the electric oil pump 32 and the SEC pulley oil chamber 22c and reaches the switching valve 36.

In addition, in the hydraulic circuit 3, oil passages are provided that branch from the portion of the clutch oil passage $R_{CL}$ between the pilot valve 38 and the clutch pressure solenoid 39 and connect to the line pressure solenoid 35 and the T/C hydraulic pressure system 41, respectively.

The line pressure solenoid 35 generates solenoid pressure corresponding to a command value of the line pressure PL and supplies the solenoid pressure to the line pressure regulating valve 34. The T/C hydraulic pressure system 41 is a hydraulic pressure system of the torque converter TC that includes a lockup clutch LU, and the oil that is drained from the line pressure regulating valve 34 is also supplied to the T/C hydraulic pressure system 41.

In the hydraulic circuit 3 configured in this manner, the mechanical oil pump 31 supplies the SEC pressure Psec to the SEC pulley oil chamber 22c, and the electric oil pump 32 controls the flow of oil in and out of the PRI pulley oil chamber 21c. The mechanical oil pump 31 is used to hold the belt 23 and the electric oil pump 32 is used for gear shifting.

That is, in principle, gear shifting is carried out by moving oil from one of the PRI pulley oil chamber 21c and the SEC pulley oil chamber 22c to the other by means of the electric oil pump 32.

The vehicle is further provided with a controller 10. The controller 10 is configured to have a transmission controller 11 and an engine controller 12.

Signals from a rotation sensor 51 for detecting the input-side rotational speed of the variator 2, a rotation sensor 52 for detecting the output-side rotational speed of the variator 2, a pressure sensor 53 for detecting PRI pressure Ppri, which is the hydraulic pressure of the PRI pulley oil chamber 21c, and a pressure sensor 54 for detecting the SEC pressure Psec, are input to the transmission controller 11. Specifically, the rotation sensor 51 detects the rotational speed Npri of the PRI pulley 21. In addition, specifically, the rotation sensor 52 detects rotational speed Nsec of the SEC pulley 22. The transmission controller 11 can detect vehicle speed VSP based on input from the rotation sensor 52.

In addition, signals from an accelerator opening degree sensor 55, a brake sensor 56, a selected range detection switch 57, an engine rotation sensor 58, an oil temperature sensor 59, and an oil pressure sensor 60 are input to the transmission controller 11.

The accelerator opening degree sensor 55 detects an accelerator opening degree APO, which represents the operation amount of the accelerator pedal. The brake sensor 56 detects a brake pedal pressing force BRK. The selected range detection switch 57 detects a range RNG that is selected with a shift lever, which is a selector. The engine rotation sensor 58 detects the rotational speed Ne of the engine ENG. The oil temperature sensor 59 detects oil temperature $T_{OIL}$ of the transmission 1. The oil temperature $T_{OIL}$ is the temperature of the oil used as the hydraulic oil in the variator 2. The oil pressure sensor 60 detects oil pressure $P_{CL}$.

The transmission controller 11 and the engine controller 12 connected so as to be capable of communicating with each other. Engine torque information Te from the engine controller 12 is input to the transmission controller 11. The signals from the accelerator opening degree sensor 55 and the engine rotation sensor 58, for example, may be input to the transmission controller 11 via the engine controller 12.

The transmission controller 11 generates a control signal including a shift control signal based on the input signals, and outputs the generated control signal to the hydraulic circuit 3. In the hydraulic circuit 3, the electric oil pump 32, the line pressure solenoid 35, the switching valve 36, the clutch pressure solenoid 39, the PRI pressure solenoid 42, and the like are controlled based on a control signal from the transmission controller 11. For example, the transmission ratio of the variator 2 is thereby controlled to a transmission ratio corresponding to the shift control signal, i.e., a target transmission ratio.

In the present embodiment, the controller 10, configured to have the transmission controller 11 and the engine controller 12, constitutes the power transmission device, together with the transmission 1.

Next, the switching positions of the switching valve 36 will be described.

Figure 2A:
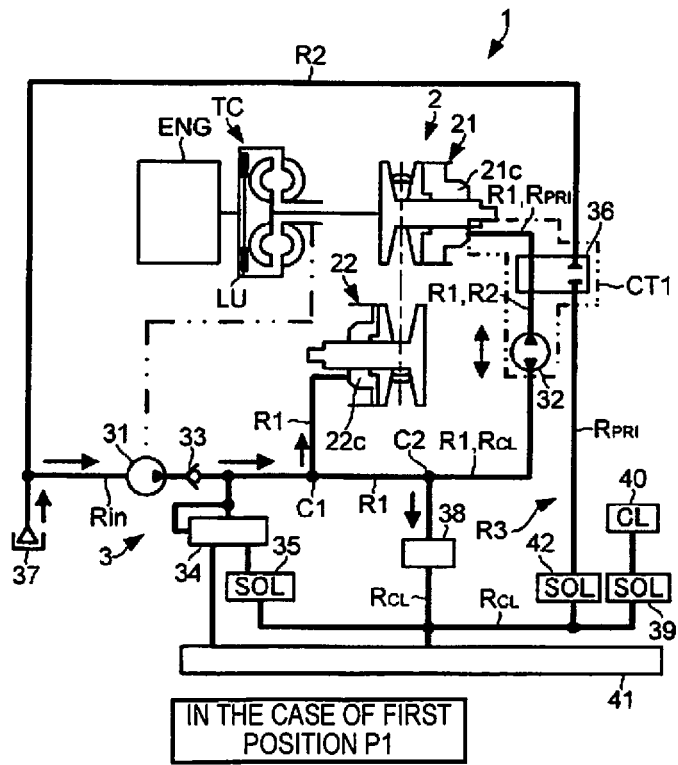
FIG. 2A is a first diagram of an explanatory diagram of a switching position of a switching valve.
Figure 2B:
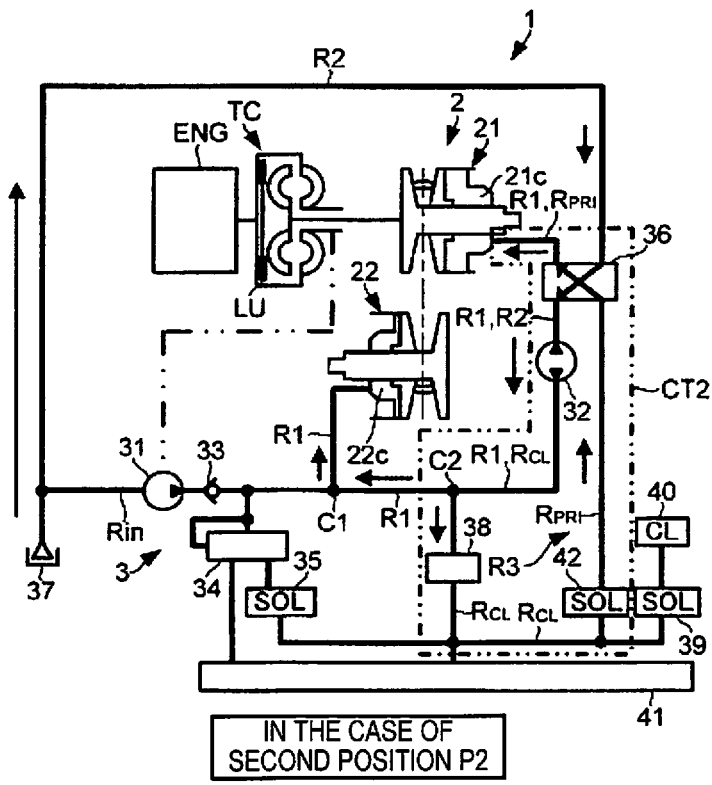
FIG. 2B is a second diagram of the explanatory diagram of the switching position of the switching valve.

FIGS. 2A, 2B are explanatory diagrams of the switching positions of the switching valve 36. FIG. 2A indicates a case in which the switching position, that is, the valve position is in the first position P1, and FIG. 2B indicates a case in which the switching position is in the second position P2.

The first position P1 is a switching position in which the first oil passage R1 is in a connected state, and the second oil passage R2 is in a cutoff state. When in the first position P1, the PRI oil passage $R_{PRI}$ dis also in the cutoff state. As a result, when in the first position P1, the mechanical oil pump 31 supplies the oil of the oil reservoir 37 to the SEC pulley oil chamber 22c and the clutch 40, and the electric oil pump 32 controls the flow of oil in and out of the PRI pulley oil chamber 21c.

The second position P2 is a switching position in which the first oil passage R1 is in a cutoff state, and the second oil passage R2 is in a connected state. When in the second position P2, the PRI oil passage $R_{PRI}$ is also in the connected state. As a result, when in the second position P2, the electric oil pump 32 is connected to the clutch 40 and the PRI pulley oil chamber 21c, and supplies the oil of the oil reservoir 37 to the clutch 40 and the PRI pulley oil chamber 21c.

In addition, when in the second position P2, it becomes possible to regulate the oil of the clutch oil passage $R_{CL}$ using the PRI pressure solenoid 42 and to supply the oil to the PRI pulley oil chamber 21c. Therefore, even if the first oil passage R1 is cut off by means of the switching valve 36, it is possible to shift the variator 2.

To further describe the first position P1 and the second position P2, when in the first position P1, a first PRI circuit CT1 is formed. The first PRI circuit CT1 is a first supply and discharge circuit that is formed at the first position P1, as a circuit that supplies and discharges oil to and from the PRI pulley oil chamber 21c. Specifically, the first PRI circuit CT1 is configured so that the electric oil pump 32, the switching valve 36, and each of the oil passages are provided between the electric oil pump 32 and the PRI pulley oil chamber 21c.

The hydraulic pressure of the first PRI circuit CT1 is a PRI-side pressure Pc1, which is controlled by the electric oil pump 32. The PRI-side pressure Pc1 is the hydraulic pressure on the PRI pulley oil chamber 21c side, that is, the oil inlet/outlet 32a side, of the electric oil pump 32. Specifically, the PRI-side pressure Pc1 is indicated by the hydraulic pressure of the portion of the first PRI circuit CT1 between the electric oil pump 32 and the switching valve 36, during both the formation and cutoff of the first PRI circuit CT1.

When in the second position P2, a second PRI circuit CT2 is formed. The second PRI circuit CT2 is a second supply and discharge circuit that is formed at the second position P2, as a circuit that supplies and discharges oil to and from the PRI pulley oil chamber 21c. Specifically, the second PRI circuit CT2 is configured so that the electric oil pump 32, the pilot valve 38, the PRI pressure solenoid 42, the switching valve 36, and each of the oil passages are provided between the electric oil pump 32 and the PRI pulley oil chamber 21c.

The hydraulic pressure of the second PRI circuit CT2 is a SOL pressure Pc2, which is controlled by the PRI pressure solenoid 42. The SOL pressure Pc2 is the hydraulic pressure on the PRI pulley oil chamber 21c side of the PRI pressure solenoid 42, that is, the downstream side of the PRI pressure solenoid 42. Specifically, the SOL pressure Pc2 is indicated by the hydraulic pressure of the portion of the second PRI circuit CT2 between the PRI pressure solenoid 42 and the switching valve 36, during both the formation and cutoff of the second PRI circuit CT2.

Coupled with the understanding of the second oil passage R2 and the switching valve 36 as described above, the switching valve 36 can be understood as follows. That is, the switching valve 36 can be understood to be a switching valve that switches between two positions, the first position P1, in which at least the first oil passage R1 is in a connected state, and the second position P2, in which the second oil passage R2 and the first oil passage R1 on a side of the SEC pulley oil chamber 22c are in a connected state and in which the third oil passage R3 and the PRI pulley oil chamber 21c side of the first oil passage R1 are in a connected state.

If there is a hydraulic pressure difference ΔP between the first PRI circuit CT1 and the second PRI circuit CT2 when the switching valve 36 is switched, a sudden change in the hydraulic pressure could occur. Therefore, in the present embodiment the controller 10 carries out the following control.

Figure 3:
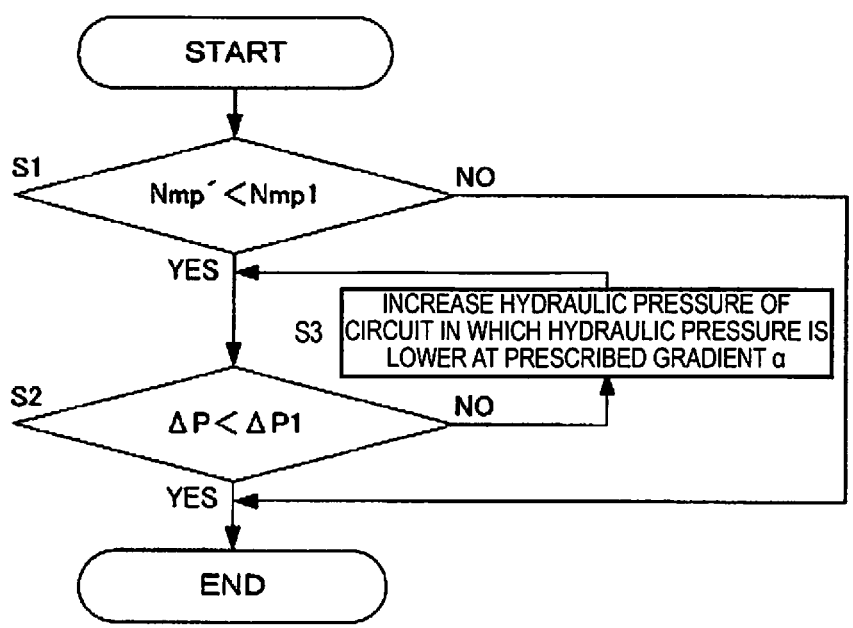
FIG. 3 is a flowchart showing one example of a control carried out by a controller.

FIG. 3 is a flowchart showing one example of the control carried out by the controller 10.

In Step S1, the controller 10 determines whether a rotational speed Nmp' is less than a prescribed rotational speed Nmp1. The rotational speed Nmp' is the rotational speed Nmp of the mechanical oil pump 31 when being driven by the power from the drive wheels. The prescribed rotational speed Nmp1 is a preset determination value for determining whether a discharge flow rate Qmp' is less than a required flow rate Qr. The discharge flow rate Qmp' is the discharge flow rate Qmp of the mechanical oil pump 31 when being driven by the power from the drive wheels. Specifically, the prescribed rotational speed Nmp1 is a variable value, and is set to increase as the oil temperature $T_{OIL}$ increases.

Situations in which driving is carried out by the power from the drive wheels include actual cases, that is, cases in which the mechanical oil pump 31 is actually being driven by the power from the drive wheels. In a situation in which the discharge flow rate Qmp' is less than the required flow rate Qr in an actual case, the oil flow rate achieved when the oil is supplied by the mechanical oil pump 31 would be insufficient.

Therefore, such a situation can be said to be a situation in which the operation of the switching valve 36 is required so as to use the electric oil pump 32 for the source pressure. Accordingly, by determining in Step S1 whether the rotational speed Nmp' is less than the prescribed rotational speed Nmp1, a determination is made regarding whether it is a situation in which an operation of the switching valve 36 is required. A case in which the rotational speed Nmp' is the prescribed rotational speed Nmp1 may be included in the positive determination of Step S1. The same applies to the determination of the subsequent Step S2.

When being driven by the power from the drive wheels also includes hypothetical cases, that is, cases in which the mechanical oil pump 31, which is being driven by the power from the engine ENG, is considered to be driven by the power from the drive wheels. Such a case will be described further below using FIG. 4B.

In other words, the rotational speed Nmp' being less than the prescribed rotational speed Nmp1 means that the vehicle speed VSP is less than a prescribed vehicle speed VSP1. The prescribed vehicle speed VSP1 can be set in advance as a determination value similar to the prescribed rotational speed Nmp1. In the case of a negative determination in Step S1, the process is temporarily ended, and in the case of a positive determination in Step S1, the process proceeds to Step S2.

In Step S2, the controller 10 determines whether the hydraulic pressure difference ΔP is smaller than a threshold value ΔP1. The hydraulic pressure difference ΔP is the absolute value of the hydraulic pressure difference between a pre-switching PRI circuit, which is a circuit formed before the switching of the switching valve 36 and a circuit for supplying and discharging oil to and from the PRI pulley oil chamber 21c, and a post-switching PRI circuit, which is a circuit formed after the switching valve 36 has been switched.

For example, when the switching valve 36 is switched from the first position P1 shown in FIG. 2A to the second position P2 shown in FIG. 2B described above, the pre-switching PRI circuit is the first PRI circuit CT1 and the post-switching PRI circuit is the second PRI circuit CT2. In addition, in this case, the hydraulic pressure difference ΔP is specifically the temporal hydraulic pressure difference before the switching valve 36 is switched.

Accordingly, in this case, the hydraulic pressure difference ΔP is the magnitude of the hydraulic pressure difference between the PRI-side pressure Pc1 and the SOL pressure Pc2 before the switching valve 36 is switched, that is, when in the first position P1. The threshold value ΔP1 is set in advance as a limit value of a hydraulic pressure difference ΔP for which the hydraulic pressure fluctuation falls within an allowable range, when the switching valve 36 is switched. The hydraulic pressure difference ΔP such as the foregoing can be said to be the hydraulic pressure difference between the third oil passage R3 and the PRI pulley oil chamber 21c side of the first oil passage R1. In the case of a negative determination in Step S2, the process proceeds to Step S3.

In Step S3, the controller 10 increases the hydraulic pressure of a circuit from among the first PRI circuit CT1 and the second PRI circuit CT2 in which the hydraulic pressure is lower before the switching valve 36 is switched. In other words, in Step S3, from among the third oil passage R3 and the first oil passage R1 on the side of the PRI pulley oil chamber 21c, the hydraulic pressure of the oil passage in which the hydraulic pressure is lower before the switching valve 36 is switched is increased, that is, the lower hydraulic pressure from among the PRI-side pressure Pc1 and the SOL pressure Pc2.

When the switching valve 36 is switched from the first position P1 to the second position P2, the circuit in which the hydraulic pressure is lower before the switching valve 36 is switched is the second PRI circuit CT2. This is because, in the second PRI circuit CT2, the switching valve 36 puts the circuit in the cutoff state and the PRI pressure solenoid 42 drains the oil before the switching valve 36 is switched, so that the SOL pressure Pc2 becomes zero gauge pressure.

In Step S3, the controller 10 specifically increases the hydraulic pressure of the circuit in which the hydraulic pressure is lower at a prescribed gradient α. In other words, the gradient indicates the temporal change in the hydraulic pressure. By increasing the hydraulic pressure in Step S3, the hydraulic pressure difference ΔP changes so as to become smaller than the threshold value ΔP1. After Step S3, the process returns to Step S2.

Thereafter, until there is a positive determination in Step S2, the hydraulic pressure is increased in Step S3. Then, when the hydraulic pressure difference ΔP becomes smaller than the threshold value ΔP1, Step S2 results in a positive determination and the process is ended.

Figure 4A:
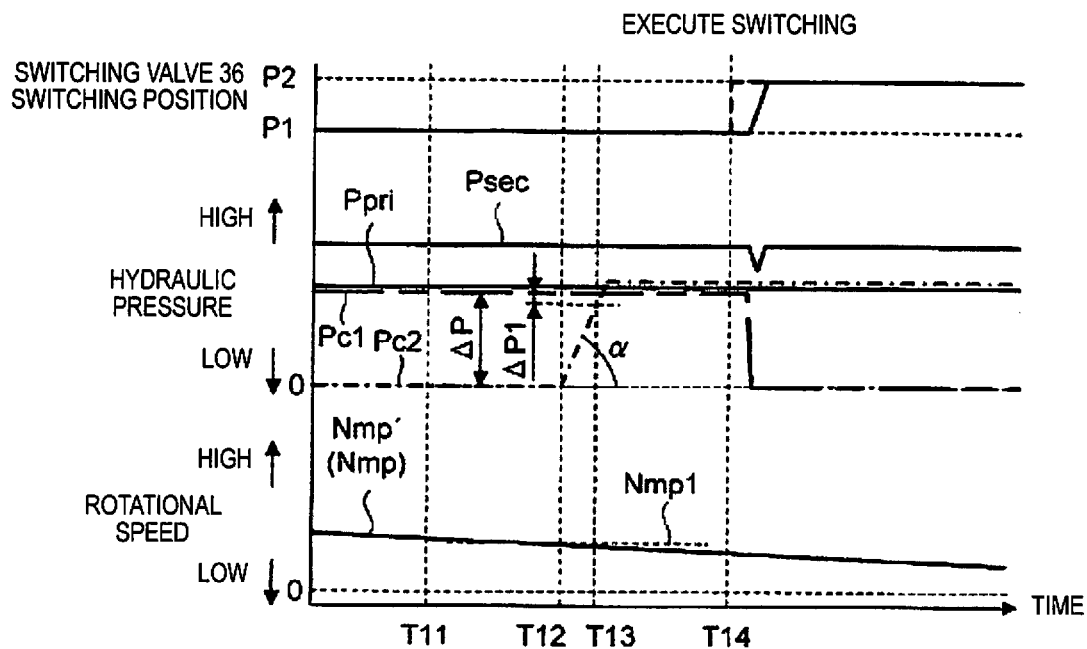
FIG. 4A is a diagram showing a first example of a timing chart.

FIG. 4A is a diagram showing a first example of a timing chart corresponding to the flowchart shown in FIG. 3. FIG. 4A shows a case in which the switching valve 36 is switched from the first position P1 to the second position P2. Specifically, as such, FIG. 4A shows a case in which the vehicle is decelerated and stopped in a state in which the engine ENG is brought to a coast stop. The coast stop is executed when the next coast stop condition is satisfied, and is released when the next coast stop release condition is satisfied.

That is, the coast stop condition includes: the vehicle speed VSP is less than a prescribed vehicle speed VSP2; the accelerator pedal is not depressed; the brake pedal is depressed; and a forward range is selected by the transmission 1. The prescribed vehicle speed VSP2 is the vehicle speed VSP at which the lockup clutch LU is released. The coast stop release condition occurs, for example, when any one of these conditions constituting the coast stop condition is not satisfied.

At timing T11, the switching position of the switching valve 36 is the first position P1. Therefore, at timing T11, the first PRI circuit CT1 is formed, and the PRI-side pressure Pc1 forms the PRI pressure Ppri. The hydraulic pressures do not match in the diagram in order to prevent overlaps in the diagrams. On the other hand, in the second PRI circuit CT2, since the oil is drained by the PRI pressure solenoid 42, the SOL pressure Pc2 is zero gauge pressure.

At timing T11, the rotational speed Nmp' of the mechanical oil pump 31 is higher than the prescribed rotational speed Nmp1. The mechanical oil pump 31 is driven by the power from the drive wheels until the lockup clutch LU is released immediately before the vehicle stops. Therefore, the rotational speed Nmp' becomes a rotational speed corresponding to the rotational speed Npri, and is the same as the rotational speed Nmp.

At timing T12, the rotational speed Nmp' becomes less than the prescribed rotational speed Nmp1. On the other hand, the PRI-side pressure Pc1 is the PRI pressure Ppri and the SOL pressure Pc2 is zero gauge pressure, so that the hydraulic pressure difference ΔP between the PRI-side pressure Pc1 and the SOL pressure Pc2 is greater than the threshold value ΔP1. Therefore, at timing T12 the SOL pressure Pc2, which is the lower hydraulic pressure from among the PRI-side pressure Pc1 and the SOL pressure Pc2, starts to increase. The SOL pressure Pc2 increases at the prescribed gradient α.

At timing T13, the hydraulic pressure difference ΔP becomes smaller than the threshold value ΔP1. As a result, a sudden change in the hydraulic pressure does not occur even if the switching valve 36 is switched. The SOL pressure Pc2 is then increases to the PRI pressure Ppri so as to constitute the PRI pressure Ppri after the switching of the switching valve 36.

At timing T14, the switching valve 36 is switched to the second position P2. Specifically, at timing T14, a command is issued to switch the switching valve 36 to the second position P2, as shown by the broken line is issued. As a result, in accordance with the foregoing, the actual position of the switching position of the switching valve 36 shown by the solid line changes from the first position P1 to the second position P2, as shown in the drawing.

When the actual position of the switching position changes from the first position P1 to the second position P2, the switching valve 36 cuts off the first PRI circuit CT1 while forming the second PRI circuit CT2. At this time, the electric oil pump 32 and the oil reservoir 37 are placed in a connected state, and the PRI-side pressure Pc1 becomes zero gauge pressure. In addition, the SOL pressure Pc2 constitutes the PRI pressure Ppri.

In this example the hydraulic pressure of the SEC pressure Psec fluctuates in accordance with such a switching of the switching valve 36. However, the hydraulic pressure difference ΔP is made smaller than the threshold value ΔP1 at timing T13 before the switching valve 36 is switched, so that the hydraulic pressure fluctuation of the SEC pressure Psec falls within the allowable range.

Figure 4B:
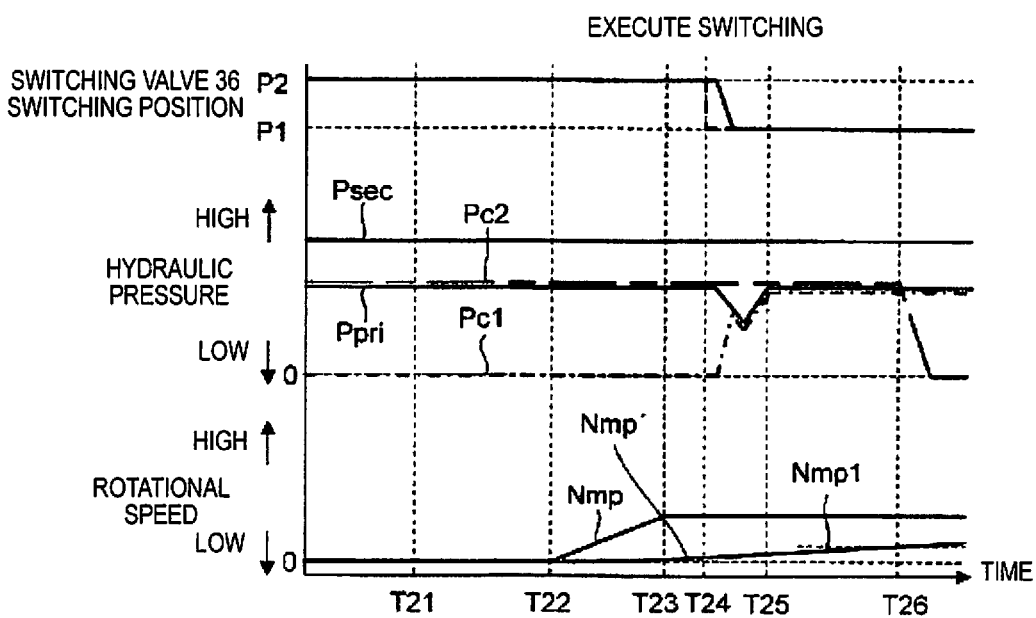
FIG. 4B is a diagram showing a second example of the timing chart.

FIG. 4B is a diagram showing a second example of a timing chart corresponding to the flowchart shown in FIG. 3. FIG. 4B shows a case in which switching from the second position P2 to the first position P1 is carried out. Specifically, as such, FIG. 4B shows a case in which the engine ENG is started from an idle stop state and the vehicle is started. The idle stop is executed when the next idle stop condition is satisfied, and is released when the next idle stop release condition is satisfied.

That is, the idle stop condition, for example, includes: the vehicle speed VSP is zero; the accelerator pedal is not depressed; the brake pedal is depressed; and the selected range of the transmission 1 is a permitted range in which the execution of the idle stop is permitted. The idle stop release condition occurs, for example, when one of these conditions constituting the idle stop condition is not satisfied.

At timing T21, the switching position of the switching valve 36 is the second position P2. In this example, specifically, the hydraulic pressure difference ΔP is the hydraulic pressure difference around the time the switching valve 36 has been switched, and the pre-switching PRI circuit is the second PRI circuit CT2 and the post-switching PRI circuit is the first PRI circuit CT1. In addition, the hydraulic pressure of the first PRI circuit CT1 is the PRI-side pressure Pc1, and is controlled to the PRI pressure Ppri after the switching valve 36 has been switched. Accordingly, as long as the SOL pressure Pc2 is controlled to the PRI pressure Ppri before the switching valve 36 is switched, the hydraulic pressure difference ΔP can be reduced.

Therefore, in this example the electric oil pump 32 is used as the source pressure pump during idle stop before the switching valve 36 is switched, to control the SOL pressure Pc2 to the PRI pressure Ppri. As a result, the hydraulic pressure difference ΔP becomes less than or equal to the threshold value ΔP1 before the switching valve 36 is switched. In this case, in the flow chart shown in FIG. 3, steps S1 and S2 result in positive determinations.

In other words, controlling the SOL pressure Pc2 to the PRI pressure Ppri means that the SOL pressure Pc2 constitutes the PRI pressure Ppri. In addition, since the PRI pressure Ppri is controlled to a target value of the PRI pressure Ppri, controlling the SOL pressure Pc2 to the PRI pressure Ppri can be said to control the SOL pressure Pc2 to the target value of the PRI pressure Ppri. In this example, before the switching valve 36 is switched, the target value of the PRI pressure Ppri is set to the target value of the PRI pressure Ppri after the switching valve 36 has been switched.

From the foregoing, at timing T21, the SOL pressure Pc2 constitutes the PRI pressure Ppri. On the other hand, in the first PRI circuit CT1, the electric oil pump 32 and the oil reservoir 37 are connected, so that the PRI-side pressure Pc1 is zero gauge pressure. In addition, the engine ENG is stopped by means of idle stop, so that the rotational speed Nmp' and the rotational speed Nmp of the mechanical oil pump 31 are zero.

At timing T22, the idle stop release condition is satisfied, and the engine ENG is started. When the vehicle starts, the mechanical oil pump 31 is driven by the power from the engine ENG. Therefore, the rotational speed Nmp increases in accordance with the rotational speed Ne. On the other hand, the lockup clutch LU is released when the vehicle starts. Therefore, the rotational speed Nmp' becomes a rotational speed corresponding to the rotational speed Npri of the PRI pulley 21, which is different from the rotational speed Nmp.

At timing T23, the starting of the engine ENG is completed. At timing T24, as the starting of the engine ENG is completed, the switching valve 36 is switched to the first position P1. As a result, the electric oil pump 32 is switched for use in shifting.

During the change of the actual position from the second position P2 to the first position P1, the PRI pressure Ppri decreases while the PRI-side pressure Pc1 increases in accordance with the switching of the switching valve 36. Then, when the actual position becomes the first position P1, the PRI-side pressure Pc1 constitutes the PRI pressure Ppri so that the PRI-side pressure Pc1 and the PRI pressure Ppri are controlled to the target value of the PRI pressure Ppri by the electric oil pump 32.

At timing T25, the PRI-side pressure Pc1 and the PRI pressure Ppri become the target value of the PRI pressure Ppri. As a result, the hydraulic pressure fluctuation that occurred when the switching valve 36 was switched converges.

In this example, such hydraulic pressure fluctuation of the PRI pressure Ppri is generated in accordance with the switching of the switching valve 36. However, the hydraulic pressure difference ΔP is made smaller than the threshold value ΔP1 at timing T24 before the switching valve 36 is switched, so that the hydraulic pressure fluctuation of the PRI pressure Ppri falls within the allowable range.

On the other hand, at timing T25, the rotational speed Nmp' becomes less than the prescribed rotational speed Nmp1. As a result, the mechanical oil pump 31, which is being driven by the power from the engine ENG, is considered to be driven by the power from the drive wheels, that is, in the hypothetical case described above, the oil flow rate achieved when the oil was supplied by the mechanical oil pump 31 would be insufficient. Accordingly, even in such a situation it can be said that the operation of the switching valve 36 is required in order to use the electric oil pump 32 for the source pressure.

Therefore, in this example, when the rotational speed Nmp' is less than or equal to the prescribed rotational speed Nmp1, the SOL pressure Pc2 is maintained at the target value of the PRI pressure Ppri even after the switching valve 36 has been switched, to thereby set the hydraulic pressure difference ΔP to be less than or equal to threshold value ΔP1 in preparation for further switching, even after the switching valve 36 has been switched. As a result, prior to further switching, the hydraulic pressure difference ΔP, which is the magnitude of the hydraulic pressure difference between the SOL pressure Pc2 and the PRI-side pressure Pc1 before switching, is set to be less than or equal to the threshold value ΔP1.

At timing T26, the rotational speed Nmp' becomes higher than the prescribed rotational speed Nmp1, so that the situation no longer requires operation of the switching valve 36. Therefore, the SOL pressure Pc2 is not maintained at the target value of the PRI pressure Ppri, and becomes zero gauge pressure due to the draining of the oil carried out by the PRI pressure solenoid 42. When the switching position is the first position P1, the SOL pressure Pc2 can be set in this manner by controlling the PRI pressure solenoid 42 following a negative determination in Step S1 of the flowchart shown in FIG. 3 described above.

Next, the main action and effects of the present embodiment will be described.

The method for controlling a power transmission device according to the present embodiment is used in a power transmission device comprising the variator 2, the first oil passage R1, the electric oil pump 32 provided in the first oil passage R1, the second oil passage R2, the switching valve 36, and the third oil passage R3, wherein the switching valve 36 switches between two positions, the first position P1 and the second position P2. The method for controlling a power transmission device includes making the magnitude of the hydraulic pressure difference ΔP to be smaller than the threshold value ΔP1 when switching the switching valve 36 between the first position P1 and the second position P2.

According to this method, the hydraulic pressure difference ΔP is made smaller than the threshold value ΔP1 before the switching valve 36 is switched, so that, when the switching valve 36 is switched, it is possible to prevent unintended shifting or belt slippage from occurring in the variator 2.

In the present embodiment, from among the third oil passage R3 and the PRI pulley oil chamber 21c side of the first oil passage R1, the hydraulic pressure of the oil passage, in which the hydraulic pressure is lower before the switching valve 36 is switched, is increased to thereby make the hydraulic pressure difference ΔP to be smaller than the threshold value ΔP1. According to such a method, it is possible to prevent belt slippage from occurring when making the hydraulic pressure difference ΔP to be smaller than the threshold value ΔP1.

In the present embodiment, the hydraulic pressure difference ΔP is made smaller than the threshold value ΔP1 in a situation in which the operation of switching valve 36 is required. According to such a method, it is possible to appropriately switch the switching valve 36 in accordance with a request, such as promptly switching the switching valve 36 when there is a request, while suppressing the occurrence of unintended shifting or belt slippage in the variator 2.

In the present embodiment, the power transmission device further comprises the mechanical oil pump 31, and the hydraulic pressure difference ΔP is made smaller than the threshold value ΔP1 when the rotational speed Nmp' of the mechanical oil pump 31 is less than the prescribed rotational speed Nmp1, as a situation in which the operation of the switching valve 36 is required. According to such a method, it is possible to switch the switching valve 36 in accordance with a request, if the oil flow rate achieved when the oil is supplied by the mechanical oil pump 31 is insufficient.

In addition, if the oil flow rate achieved when the oil is supplied by the mechanical oil pump 31 is insufficient, the actual pressure of the line pressure PL cannot be increased to the command pressure, so that the actual pressure differs from the command pressure.

Therefore, the hydraulic pressure difference ΔP may be made smaller than the threshold value ΔP1 when the difference between the actual pressure and the command pressure of the line pressure PL is larger than a prescribed value, as a situation in which the operation of the switching valve 36 is required. Said prescribed value can be set in advance as a determination value similar to the prescribed rotational speed Nmp1. As a result, it is possible to reliably detect cases in which the oil flow rate achieved when the oil is supplied by the mechanical oil pump 31 is insufficient, and to switch the switching valve 36 on the basis thereof.

Embodiments of the present invention have been described above, however the above-described embodiments illustrate only a portion of the application examples of the present invention, and are not intended to limit the technical scope of the present invention to the specific configurations of the above-described embodiments.

In the embodiment described above, a case in which the method for controlling a power transmission device and the corresponding control unit are realized by the controller 10, composed of a plurality of controllers, has been described. However, the method for controlling a power transmission device and the corresponding control unit may be realized by a single controller, such as the transmission controller 11.

The invention claimed is:

1. A control method for controlling a power transmission device that is provided with a continuously variable transmission mechanism for transmitting power between a drive source and a drive wheel, a first oil passage that connects a primary pulley oil chamber and a secondary pulley oil chamber of the continuously variable transmission mechanism, an electric oil pump provided in the first oil passage, a second oil passage that branches from the first oil passage between the electric oil pump and the primary pulley oil chamber and that is connected to an oil reservoir, a switching valve provided at a branch point between the first oil passage and the second oil passage, and a third oil passage that branches from the first oil passage between the electric oil pump and the secondary pulley oil chamber and reaches the switching valve, the switching valve switching between two positions, a first position in which at least the first oil passage is connected, and a second position in which the second oil passage connects with the first oil passage on a side of the secondary pulley oil chamber and in which the third oil passage and connects with the first oil passage on a side of the primary pulley oil chamber, the control method comprising:

making a magnitude of a hydraulic pressure difference between the third oil passage and the first oil passage one the side of the primary pulley oil chamber smaller than a prescribed threshold value when switching the switching valve between the first position and the second position.

2. The control method according to claim 1, wherein
the making of the magnitude of the hydraulic pressure difference smaller than the prescribed threshold value is carried out by increasing hydraulic pressure of an oil passage from among the third oil passage and the first oil passage on the side of the primary pulley oil chamber side in which the hydraulic pressure is lower before the switching valve is switched.

3. The control method according to claim 1, wherein
the magnitude of the hydraulic pressure difference is made smaller than the prescribed threshold value is carried out when a situation in which the operation of the switching valve is required.

4. The control method according to claim 3, wherein
the power transmission device further comprises a mechanical oil pump that is driven by the drive source and that is configured to be capable of supplying the oil of the oil reservoir to the secondary pulley oil chamber, and the situation for carrying out the making of the magnitude of the hydraulic pressure difference smaller than the prescribed threshold value is when a rotational speed of the mechanical oil pump when being driven by power from the drive wheel is less than a prescribed rotational speed.

5. The control method according to claim 3, wherein
the situation for carrying out the making of the magnitude of the hydraulic pressure difference smaller than the prescribed threshold value is when a magnitude of a difference between an actual pressure and a command pressure of a line pressure is larger than a prescribed value.

6. A power transmission device comprising:
a continuously variable transmission mechanism that transmits power between a drive source and a drive wheel;
a first oil passage that connects a primary pulley oil chamber and a secondary pulley oil chamber of the continuously variable transmission mechanism;
an electric oil pump provided in the first oil passage;
a second oil passage that branches from the first oil passage between the electric oil pump and the primary pulley oil chamber and that is connected to an oil reservoir;
a switching valve provided at a branch point between the first oil passage and the second oil passage; and
a third oil passage that branches from the first oil passage between the electric oil pump and the secondary pulley oil chamber and reaches the switching valve,
the switching valve switching between two positions including a first position in which at least the first oil passage is connected, and a second position in which the second oil passage connects with the first oil passage on a side of the secondary pulley oil chamber and in which the third oil passage and connects with the first oil passage on a side of the primary pulley oil chamber; and a control unit configured to make a magnitude of a hydraulic pressure difference between the third oil passage and the first oil passage one the side of the primary pulley oil chamber smaller than a prescribed threshold value when switching the switching valve between the first position and the second position.

* * * * *